June 2, 1936.  E. WANAMAKER  2,043,134
RAIL HIGHWAY VEHICLE
Filed Dec. 22, 1933
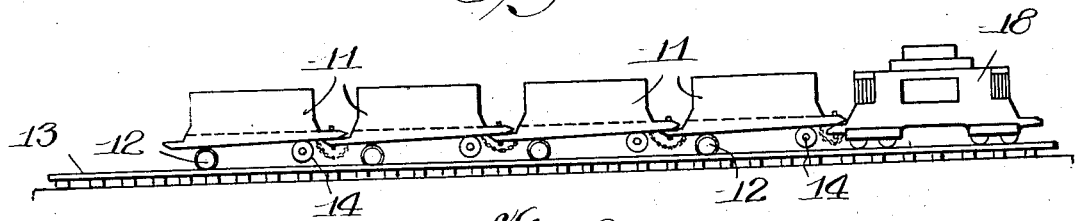
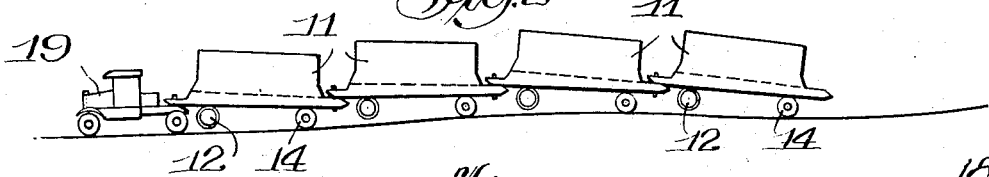
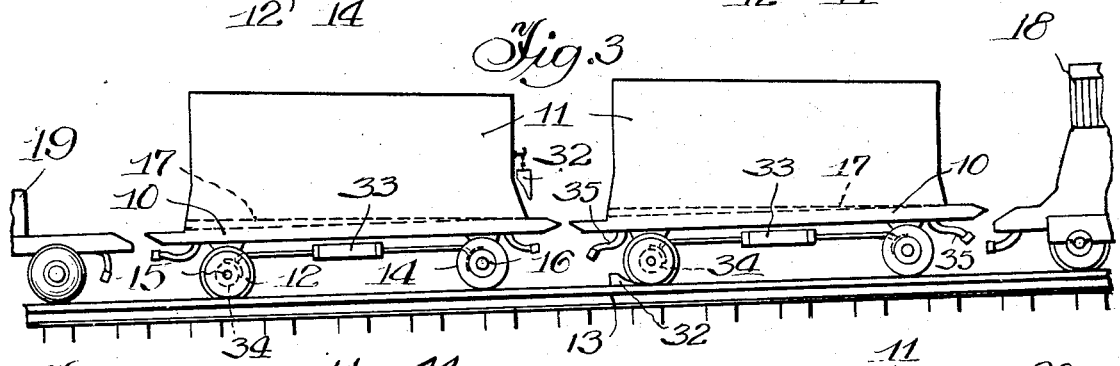
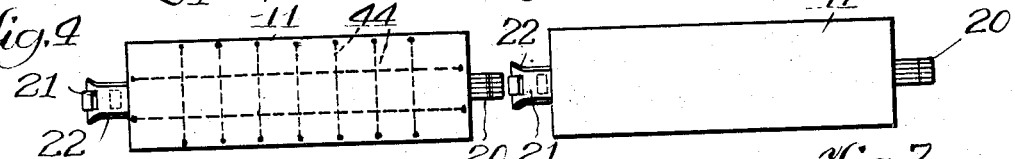
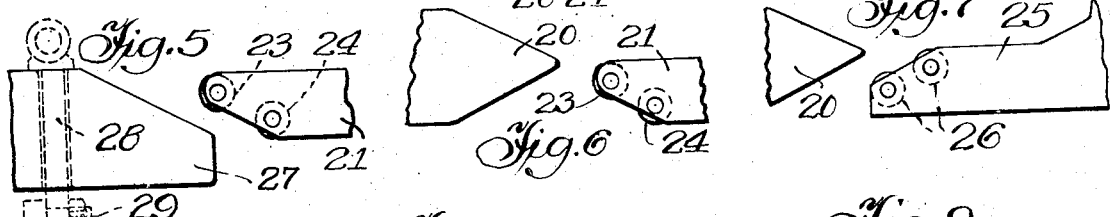
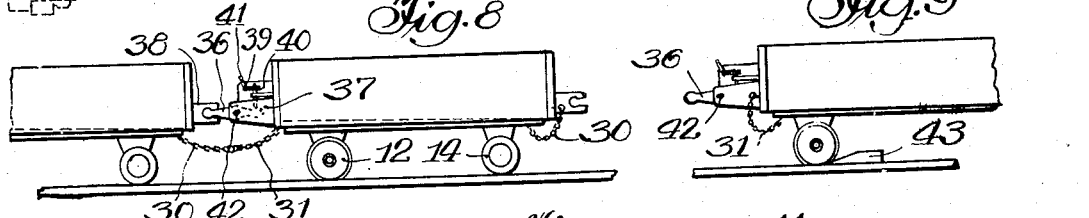
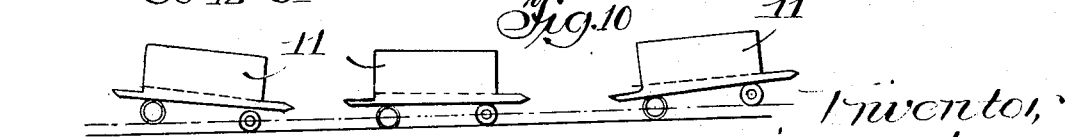

Patented June 2, 1936

2,043,134

UNITED STATES PATENT OFFICE 2,043,134

RAIL-HIGHWAY VEHICLE

Ernest Wanamaker, Chicago, Ill.

Application December 22, 1933, Serial No. 703,579

11 Claims. (Cl. 105—215)

My invention relates to improvements in vehicles adapted to run either on a highway or on a railroad track.

Various proposals have been made heretofore to construct vehicles with two sets of wheels, one set having flanges to run on a railroad track, and a second set having rubber tires or a steel rim adapted to run on a road or highway. In some cases, the highway wheels would be parallel to and just outside of the flanged wheels and were of slightly greater diameter than the former so that when the vehicle ran on a highway the flanged wheels would clear the same. When such vehicles, however, were supported by the rails of a railroad track, the highway wheels would be lower than the top of the rails, making it impossible to run past switches, unless additional means were provided to raise the road wheels to provide the proper clearance.

In other cases jacks were provided as part of the equipment whereby one set of wheels could be raised or lowered with respect to the other set so that when running along a highway the flanged wheels would be elevated somewhat and when the vehicle ran on a railway track the opposite arrangement would be in effect. In such cases, the vehicle had a different tread when running on a road from what it would have when running on a railroad track.

The construction was further complicated by the necessity of providing means for elevating one set of wheels or the other, in addition to which a certain amount of time was required to make one set of wheels or the other available before the vehicle could be switched from one class of service to the other.

The object of my invention is to provide a vehicle having wheels at one end adapted to run on the ground, and wheels at the other end adapted to run on rails, whereby said vehicle may be pulled in one direction as a highway trailer with its forward end lifted slightly and may be pulled in the opposite direction as a railroad trailer with its other end lifted.

Another object is to provide a vehicle in the form of a trailer, so constructed that a number of such vehicles may be readily made up as a train to run on a railroad track and may also be made up readily as a train or as groups of two, three or four vehicles to be drawn over a highway on rubber tired wheels, the change from one class of service to the other being possible without changing the wheels.

A further object is to provide a series of vehicles of this character with bumpers or coupling members at the front and rear end of each vehicle, those at the front end having inclined surfaces and those at the rear end having complementary, inclined surfaces whereby when one car is pushed against another, the adjacent end of said other car is lifted.

A contributory object is to provide bumpers with anti-friction rollers to facilitate lifting and coupling said cars.

Various other objects and advantages will be apparent from the description of the accompanying drawing in which the invention is illustrated.

Fig. 1 shows somewhat diagrammatically a train of cars which embody the invention, which cars are being drawn in the direction shown by the arrow, by the locomotive;

Fig. 2 is an elevation of the same cars being drawn in the opposite direction by a truck, on a highway;

Fig. 3 is an enlarged elevation of two of the cars with all of their wheels resting on a railroad track or other support at the same level;

Fig. 4 is a top plan view thereof;

Figs. 5, 6 and 7 are enlarged fragmentary views of coupling members;

Fig. 8 is a side elevation of several cars with a modified coupling;

Fig. 9 shows a supplemental appliance; and

Fig. 10 is a diagrammatic elevation of a car in a different position.

Referring to Fig. 3 in which two detached cars are shown on a somewhat larger scale than in the other figures, said cars rest on a horizontal support such as a railroad track. Each car has a suitable frame 10, preferably horizontal, which may support a body 11 somewhat similar to an automobile trailer or a box car, but preferably lighter in construction than the ordinary freight car. The frame is supported by four wheels, the two wheels 12 at one end, which for convenience in this case may be called the rear wheels, being flanged wheels to run on the rails 13 of a standard railroad track. The other two wheels 14, which may be about the same diameter as the flanged wheels, are provided with tires adapted to run on the ordinary road or highway. These may be either solid rubber tires, pneumatic tires or any other suitable tread. The axles 15, 16, are preferably fixed axles on which the car frame is suitably mounted, the wheels turning independently of each other on the ends of the axles. In the case of the flanged wheels, this differs from the usual railway practice wherein the axles rotate with the wheels. The standard practice in this regard, however, is permissible in connection with the vehicles of the present invention.

As shown in Fig. 3, the floor 17 of the car has a downward slope from left to right. The bumpers or couplers at the right hand end of each car are shown somewhat diagrammatically, in each case, as a wedge-shaped projection or coupling member, i. e. one having upper and lower inclined surfaces. The bumpers at the other end may be similarly shaped or may have a complementary surface, i. e. a lower inclined surface to be engaged by the upper inclined surface of the adjacent car as shown in Fig. 3, whereby if a locomotive 18 backs against the right hand end of a car, as shown in Fig. 1 for example, said right hand end will be lifted and the left hand end lowered so that that car may be backed against the next car and lift its forward end and so on throughout the series, until a train is made up in which each car is supported by its rear or flanged wheels on the rails, with its forward or rubber tired wheels elevated slightly. The cars are coupled by a vertical coupling pin or other suitable means hereinafter described. When the train reaches its destination the coupling pin of the rear car is withdrawn, whereupon the locomotive draws the remaining cars a few feet forward, thus lowering the elevated end of the rear car until its rubber tires rest either on the rails or on the adjacent pavement. The remaining cars are also detached and lowered to the ground in like manner, one after the other. All the cars need not necessarily be uncoupled as it may be desired merely to drop off one, two or three cars at a certain small station after which the train may proceed on its way with the remaining cars. Fig. 3 illustrates a small train of two cars which have been uncoupled from the locomotive shown at the right.

To haul the cars away to the factories or other points of destination, a truck or road tractor 19 of any suitable type may be backed up against the left hand one of the series of cars standing on the track, as in Fig. 3 for example, whereupon the left hand end of the nearest car is lifted, raising the flanged wheels from the rails. The car is then coupled to the tractor by a vertical pin or otherwise. When that car is backed against the next car, the latter is raised also and coupled, and so on. When all the available cars have been coupled together, the tractor then proceeds on its way, drawing the cars after it in the form of trailers, each running on its hind wheels or rubber tired wheels. The space between the rails is filled with wooden planks, or otherwise paved in the manner customary in freight yards so that the tractor, in getting under way, can immediately turn off from the railroad track and pull its trailers after it on the pavement and onto the highway or road. The train, as thus constituted, is shown in Fig. 2, proceeding in the direction of the arrow. The individual trailers may be dropped off at their particular destination, i. e. one at a warehouse, another at a factory, a third at a department store and so on. Thus the arrangement makes possible shipments from a building in one city to a building in another city, which buildings may be remote from a railroad track, the shipment being made without rehandling of the goods after they are once loaded into the car or trailer.

As shown in Fig. 3, the point or edge of the bumper at the right hand end is the same height above the rails as the point of the bumper at the left hand end. Thus a slight elevation of the right hand end of any car or trailer will lower the left hand end sufficiently to cause it to engage the under beveled surface of the next car. Conversely, the elevation of the left hand end of any car will cause a slight depression of the bumper at the right hand end thereof, whereby the point of said bumper can be caused to engage the lower or inclined under face of the adjacent bumper. With the arrangement shown, the amount that the right hand end of each car is lifted is equal to the height of the beveled surface which is one-half of the height of the double bevel. For example, if the double bevel or thickness of the right hand bumper is twelve inches the lift will be one-half of this or six inches, since only the lower level is effective. While both ends of the car could be provided with a double bevel, the arrangement shown is preferred in which there is a double bevel at one end and a single bevel at the other end. The latter, when it slides over the upper incline of the double bevel, gives a lift of twelve inches in the case assumed. Thus the forward end of the trailer is lifted somewhat higher when it is traveling on a highway than is the opposite or forward end of the same trailer when it is traveling in the opposite direction on a railroad track. This is because more clearance is required for the elevated wheels in one case than in the other.

Various devices may be employed for coupling the cars or trailers together. In Fig. 4 the bumper at the right hand end is shown as consisting of a series of parallel bars 20 of considerable vertical depth, faced with hard wearing surfaces. Similar bars are shown also in Figs. 6 and 7 on a larger scale. The opposite coupler 21 is provided with flaring guides 22. The coupler 21 may have rollers 23, 24 mounted within the same so as to project below the lower or inclined surface and thus provide less friction when the cars are pushed together to couple them. The top of roller 23 does not project above the adjacent substantially horizontal surface of the bumper or coupler so that said surface may support the under surface of the adjacent bumper when the cars are coupled. Said horizontal surface and the inclined surface are rounded where they meet adjacent to roller 23. The roller 24, although it projects below said inclined surface, does not project below the bottom substantially horizontal surface of the bumper.

The locomotive coupler 25 is shown in Fig. 7 and is provided with two or more rollers 26 in the upper inclined surface. It will be noted that this inclined surface is about the same height as the adjacent inclined surface of the bumper 20 so that the locomotive will lift said bumper the desired amount when the car or trailer is resting with all four wheels on the rails as in Fig. 3.

The tractor bumper 27, shown in Fig. 5 slopes in the opposite direction from the locomotive bumper and is of the proper height and length to lift the adjacent bumper 21 when the car or trailer is resting on its four wheels. Said lift is preferably greater than the lift effected by the locomotive bumper.

The parts may be coupled, in the simplest manner by a coupling pin 28 passing through vertical openings and locked against vertical separation by a horizontal locking pin 29 passed through an opening in said pin 28. It is necessary to provide a universal joint permitting movement in two planes and this may be effected in various other ways. The coupling pins may be connected to the cars by a suitable chain, not shown. In addition, the cars may be connected together by the usual chains 30, 31, used in railroad practice, shown for convenience in Fig. 8. Chock blocks 32 are provided to block the wheels at one end or the other, if necessary, when coupling.

Also, air brakes 33 may be provided. Instead of operating on the rims of the flanged wheels, they operate preferably on drums 34 on all of the wheels after the manner of automobile brakes. Each car may be connected to the adjacent car by the usual hose coupling 35.

A further form of coupling is shown in Fig. 8 in which one end of a car may be lifted manually by means of a rigid but pivoted coupling bar 36, having one end received in a coupling 37 and adapted to fit in a suitable opening or socket in the adjoining coupling 38 at its other end. By means of suitable mechanism such as a worm and gear 39, 40 and a handle 41 or power drive, the pivoted coupling bar, which may be stiffened vertically, may be rocked about the pivotal support 42 to thereby raise the end of one of the two cars to which it is coupled. This coupling device may be operated electrically or by an air motor or by means of a manual or power operated jack, depending on the size of the car.

In Fig. 10 in which the showing is somewhat diagrammatic, a car is shown in the three different positions which it occupies at one time or another. In the middle of the three positions it is standing on a horizontal support, representing the ground or a railway track. The left hand figure shows it tilted up in the position it assumes when running on the highway and the right hand figure shows it tilted up in the opposite direction when running on a railway track.

The cars, in the various figures, may be provided with four wheel trucks at each end if the construction is made sufficiently light, although for small trailers the two wheel construction at each end is preferred. As shown in Fig. 3, the roofs of the cars preferably slope somewhat from left to right so that when the cars are being drawn along a railroad track, as shown in Fig. 1, the tops of the roofs are in substantially a horizontal plane. Also, the floors of the cars are preferably horizontal.

Although the trailers are provided with means for lifting one end or the other when they are forced against each other, various other lifting means may be employed, as for example a jack. Also, wedge shaped blocks may be placed on the ground or on the rails against the wheels at one end or the other, whichever it is desired to raise, so that when the trailer is moved a few inches by a locomotive, a tractor or an adjacent trailer, said wheels will ride up the incline to lift the end of the car the desired amount, after which it may be suitably coupled to the adjoining vehicle. Such wedge shaped blocks 43 are shown in Fig. 9.

It will be noted that the train, whether running on rails or the road, is articulated and consists of a series of cars each running on two wheels or on a four wheel truck and pivoted to the car in front of it. The train may, of course, back up as well as run forward. Where it is undesirable to have the floors of the cars slope from front to rear when they are being drawn over the highway, means may be provided for adjusting said floors to maintain them level on the highway as well as on the railroad and said cars may, of course, be equipped to carry passengers rather than freight. Where freight is carried, cargo slings may be provided such as indicated by the dotted lines 44 in Fig. 4. These slings or partitions consist of webbing fastened or hooked to the vertical walls of the car to prevent the cargo from shifting. Furthermore, one or more trailers may be attached to regulation railway cars, i. e. trains consisting of what may be called primary equipment for freight and passenger service. The motor trailer trains, made up exclusively of cars or trailers such as shown in this application, may be designated "secondary equipment". The motors or locomotives designed for secondary equipment trains may, of course, by the use of suitable adapters or couplings, be used also to handle primary equipment cars.

Auxiliary equipment such as is now used with automobiles and with railway equipment may also be provided, such as shock absorbers, springs, spring buffers and the like.

I claim:

1. A rail-highway trailer comprising a body having wheels at one end in substantially fixed relation thereto, to run on the ground and wheels at the other end in substantially fixed relation thereto, to run on rails, whereby said trailer may be pulled in one direction as a highway trailer, with its forward wheels lifted, and may be pulled in the opposite direction as a railroad trailer, with its other wheels lifted.

2. A rail-highway trailer comprising a load-carrying platform, an axle beneath the same near each end in substantially fixed relation thereto, rubber tired wheels on one of said axles to run on a road when the opposite end of said platform is lifted, and flanged wheels rotatable on the other of said axles to run on rails when the other end of said platform is lifted.

3. A rail-highway vehicle comprising a load-carrying platform, an axle beneath the same near each end and connected thereto, rubber tired wheels on one of said axles to run on a road when the opposite end of said platform is lifted, and flanged wheels rotatable on the other of said axles to run on rails when the other end of said platform is lifted, said platform having end bumpers with inclined under surfaces, to be engaged and lifted by another vehicle.

4. A rail-highway trailer comprising a covered vehicle having a floor and a roof and having wheels at one end to run on the ground and wheels at the other end to run on rails, said wheels being in substantially fixed relation to said platform, whereby said trailer may be pulled in one direction as a highway trailer, with its forward end lifted, and may be pulled in the opposite direction as a railroad trailer, with its other end lifted, said floor being mounted higher above the bottom of the wheels at one end than at the other, whereby it is substantially horizontal when said vehicle has said other end lifted a predetermined amount and is running on rails, but slopes downwardly from front to rear when running in the opposite direction as a highway trailer.

5. A rail-highway trailer comprising a body having wheels at one end to run on the ground and wheels at the other end to run on rails in substantially fixed relation to said body, whereby said trailer may be pulled in one direction as a highway trailer, with its forward wheels lifted, and may be pulled in the opposite direction as a railroad trailer, with its other wheels lifted, said trailer having a wedge shaped lifting member at one end with double inclined surfaces and having a lifting member at the other end having a complementary single inclined surface, the extremities of said members being the same height above the rails.

6. Equipment as in claim 5 with the addition of anti-friction rollers on said inclined surfaces.

7. A rail-highway trailer comprising a body having wheels at one end to run on the ground and wheels at the other end to run on rails, said body being mounted at substantially fixed distances above said wheels, whereby said trailer may be pulled in one direction as a highway trailer, with its forward wheels lifted, and may be pulled in the opposite direction as a railroad trailer, with its other wheels lifted, the floors of said trailers being higher above the ground at one end than at the other, whereby they may be held in substantially horizontal position when said trailers are being operated on rails.

8. A rail-highway trailer as in claim 1 with the addition of brake drums on the four wheels and brakes for said drums, brake actuating mechanism and means for connecting the brake mechanism of one trailer to that of the next trailer.

9. A rail-highway trailer as in claim 1 with the addition of a coupling bar pivoted to one end of said trailer, a coupling socket at the other end of said trailer, said pivoted coupling bar projecting substantially horizontally from the end of said trailer whereby its outer end may be received within a corresponding socket of an adjoining trailer, and mechanical means for swinging said coupling bar to inclined position to raise the end of one of said trailers.

10. A rail-highway trailer as in claim 1 having a coupling member at one end comprising spaced vertical members with beveled ends intersecting in a horizontal line, a projecting bumper member at the other end of said trailer having a horizontal upper surface, a sloping under surface also intersecting in a horizontal line at the same distance above the rails as said first mentioned line flaring side flanges on said second mentioned bumper to guide the bumper of the adjacent car into coupling position and means for locking the bumpers of one car to those of the next car.

11. A trailer comprising a frame, a set of highway wheels and a set of railway wheels connected to opposite ends of said frame in substantially fixed, permanent relation vertically with respect to said frame, means for alternatively supporting one end of said frame on one set of said wheels, including a coupling at the other end of said frame for connecting said other end to a vehicle and for supporting said end on said vehicle in elevated position.

ERNEST WANAMAKER.

CERTIFICATE OF CORRECTION.

Patent No. 2,043,134.

June 2, 1936.

ERNEST WANAMAKER.

It is hereby certified that error appears in the printed specification of the above numbered patent requiring correction as follows: Page 3, second column, line 23-24, claim 1, strike out the words and comma "in substantially fixed relation thereto,"; and that the said Letters Patent should be read with this correction therein that the same may conform to the record of the case in the Patent Office.

Signed and sealed this 15th day of September, A. D. 1936.

(Seal)

Henry Van Arsdale
Acting Commissioner of Patents.